(12) United States Patent
Kim

(10) Patent No.: US 7,847,860 B2
(45) Date of Patent: Dec. 7, 2010

(54) CAMERA ASSEMBLY FOR A MOBILE COMMUNICATION DEVICE

(75) Inventor: Ki-Sun Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 1106 days.

(21) Appl. No.: 10/837,421

(22) Filed: Apr. 30, 2004

(65) Prior Publication Data
US 2004/0218092 A1 Nov. 4, 2004

(30) Foreign Application Priority Data
Apr. 30, 2003 (KR) ..................... 10-2003-0027785

(51) Int. Cl.
H04N 5/225 (2006.01)
H04B 1/38 (2006.01)
H04M 1/00 (2006.01)

(52) U.S. Cl. .................. 348/375; 455/575.3; 455/575.1

(58) Field of Classification Search ............. 455/556.1, 455/556.2, 557, 575.3, 556; 348/375, 211.2, 348/14.02, 207.1, 552, 373, 374, 376, 207.99
See application file for complete search history.

(56) References Cited

U.S. PATENT DOCUMENTS

| 6,069,648 | A * | 5/2000 | Suso et al. ............... 348/14.02 |
| 6,320,961 | B1 * | 11/2001 | Hayasaka ............... 379/433.13 |
| 6,396,924 | B1 * | 5/2002 | Suso et al. ............. 379/433.13 |
| 6,697,117 | B1 * | 2/2004 | Park .......................... 348/373 |
| 6,704,586 | B2 * | 3/2004 | Park ........................ 455/575.3 |
| 6,785,935 | B2 * | 9/2004 | Ahn et al. ..................... 16/221 |
| 6,812,958 | B1 * | 11/2004 | Silvester .................. 348/207.1 |
| 6,879,337 | B2 * | 4/2005 | Tatehana et al. .......... 348/14.02 |
| 6,882,726 | B2 * | 4/2005 | Kim ....................... 379/433.13 |
| 7,184,803 | B2 * | 2/2007 | Wu .......................... 455/575.1 |
| 7,210,629 | B2 * | 5/2007 | Cho et al. ..................... 235/454 |
| 7,359,740 | B2 * | 4/2008 | Okuzako et al. .......... 455/575.3 |
| 7,418,280 | B2 * | 8/2008 | Lee .......................... 455/575.3 |
| 7,424,214 | B2 * | 9/2008 | Kim et al. ...................... 396/72 |
| 7,477,315 | B2 * | 1/2009 | Shin .......................... 348/373 |
| 7,477,736 | B2 * | 1/2009 | Ibaraki et al. .......... 379/433.13 |
| 7,565,186 | B2 * | 7/2009 | Okuzako et al. .......... 455/575.3 |
| 7,586,538 | B2 * | 9/2009 | Cho ........................... 348/374 |
| 2004/0095500 | A1 * | 5/2004 | Sato et al. .................... 348/340 |
| 2005/0200740 | A1 * | 9/2005 | Kim et al. .................... 348/335 |

FOREIGN PATENT DOCUMENTS

| CN | 1404284 | | 3/2003 |
| JP | 2003163824 A | * | 6/2003 |
| KR | 1020030057080 | | 4/2003 |
| KR | 10-2004-0035251 | | 4/2004 |
| KR | 9-5-2005-045331254 | | 11/2005 |
| WO | WO 02/076067 | | 9/2002 |

* cited by examiner

Primary Examiner—Lin Ye
Assistant Examiner—Amy Hsu
(74) Attorney, Agent, or Firm—Lee, Hong, Degerman, Kang & Waimey

(57) ABSTRACT

A camera assembly for a mobile communication device comprises a camera and a case adapted to accommodate the camera. The case is adapted to elastically support the camera with the elastic support being biased in one direction. The camera assembly is adapted for slidably drawing the camera in the case against the elastic support bias. The camera assembly is also adapted for slidably drawing the camera out of the case under the elastic support bias.

6 Claims, 6 Drawing Sheets

CAMERA ASSEMBLY FOR A MOBILE COMMUNICATION DEVICE

CROSS-REFERENCE TO RELATED APPLICATIONS

Pursuant to 35 U.S.C. §119(a), this application claims the benefit of earlier filing date and right of priority to Korean Patent Application No. 10-2003-0027785, filed on Apr. 30, 2003, the contents of which is hereby incorporated by reference in its entirety.

BACKGROUND OF THE INVENTION

1. Field of the Invention

The present invention relates generally to mobile communication devices and more particularly to a camera assembly for a mobile communication device.

2. Description of the Related Art

Some mobile communication devices may be classified according to camera mounting position, such as, for example, a body mounted type, a foldable cover mounted type, or a hinge mounted type. The latter type typically allows a relatively wide camera-viewing angle. The term "mobile communication devices" may comprise mobile telephones, cellular telephones, personal communication systems (PCS), personal data assistants (PDA), laptop computers, and any other devices capable of wireless communication.

As schematically shown in FIGS. 1-2, a conventional mobile communication device 20 comprises a main body 22, a foldable cover 24 adapted to rotate relative to main body 22 via a hinge portion 26, and a camera assembly 28 coupled to hinge portion 26. Camera assembly 28 includes a camera lens 30 mounted on a front portion and a knob 32 mounted on a side portion thereof.

Camera lens 30 is always exposed to the outside world. This type of exposure allows foreign matter, such as dust particles and the like, to be deposited on its outer surface. Dust particle deposits contribute to deterioration in photographic quality. In addition, camera lens 30 may be easily damaged by an accidental external impact.

SUMMARY OF THE INVENTION

In accordance with one aspect of the present invention, a camera assembly for a mobile communication device comprises a camera, a case adapted to accommodate the camera, means for elastically supporting the camera within the case, wherein the elastic means is biased in one direction, and means for slidably drawing the camera in the case against the bias of the elastic means and out of the case under the bias of the elastic means.

The elastic means includes at least one spring. The slidable drawing means includes at least one pawl coupled to an inner surface of the case, and at least one guiding groove formed on an outer surface of the camera and adapted to slidably engage the pawl in at least one location. The pawl is elastically coupled to the inner surface of the case. The guiding groove is equipped with at least one ratchet indentation adapted to engage the pawl in at least one location. The guiding groove may be oval-shaped.

In accordance with one aspect of the present invention, the guiding groove is equipped with first, second and third ratchet indentations adapted to successively engage the pawl in respective locations. The camera may be used in photographic mode when the pawl is engaged by the second ratchet indentation. The camera is fully drawn in the case when the pawl is engaged by the first ratchet indentation.

The camera is being drawn out of the case when the pawl is being moved from a position of engagement with the first ratchet indentation toward a position of engagement with the second ratchet indentation by way of the third ratchet indentation. The camera is being drawn in the case when the pawl is being moved from a position of engagement with the second ratchet indentation toward a position of engagement with the first ratchet indentation. The camera is being drawn out of the case under the bias of the elastic means. The camera is being drawn in the case against the bias of the elastic means.

The camera includes at least one camera lens. The camera further includes at least one knob for pushing the camera against the bias of the elastic means. The first, second and third ratchet indentations are operatively disposed on the guiding groove. The guiding groove may be oval-shaped. The elastic means includes at least one spring. The pawl is elastically coupled to the inner surface of the case.

These and other aspects of the present invention will become apparent from a review of the accompanying drawings and the following detailed description of the present invention.

BRIEF DESCRIPTION OF THE DRAWINGS

The present invention is generally shown by way of reference to the accompanying drawings as follows.

DETAILED DESCRIPTION OF THE PREFERRED EMBODIMENTS

Some embodiments of the present invention will be described in detail with reference to the related drawings of FIGS. 1-10. Additional embodiments, features and/or advantages of the invention will become apparent from the ensuing description or may be learned by practicing the invention.

In the figures, the drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
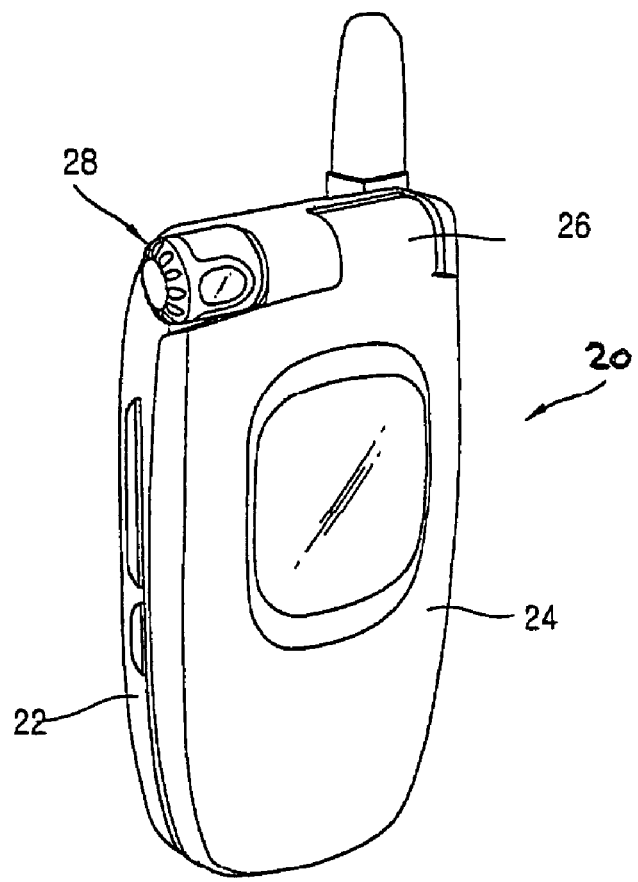
FIG. 1 schematically illustrates a conventional mobile communication device having a hinge-mounted camera assembly and a foldable cover in a closed state.
Figure 2:
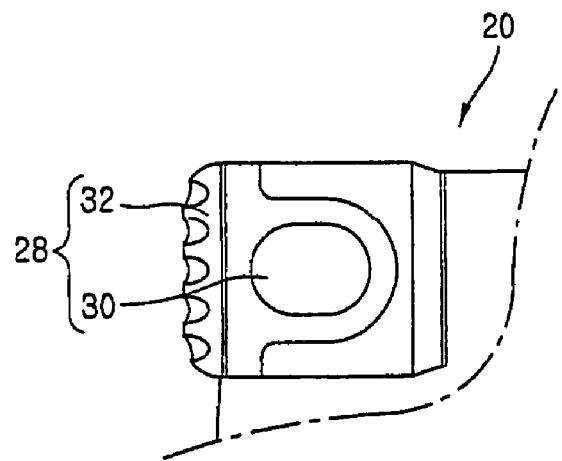
FIG. 2 partially illustrates the camera assembly of FIG. 1.
Figure 3:
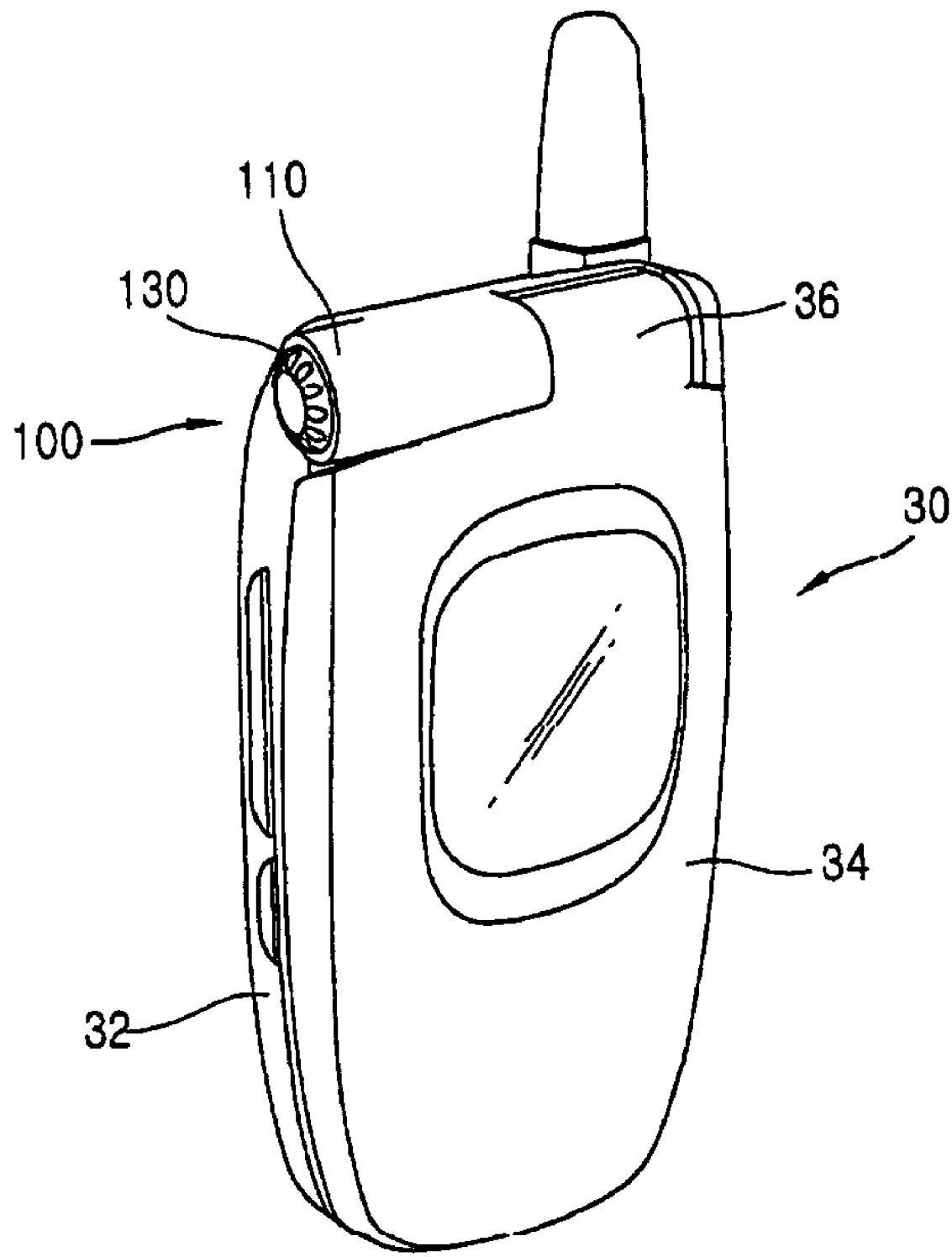
FIG. 3 schematically illustrates a mobile communication device having a hinge-mounted camera assembly and a foldable cover in a closed state in accordance with the present invention.
Figure 4:
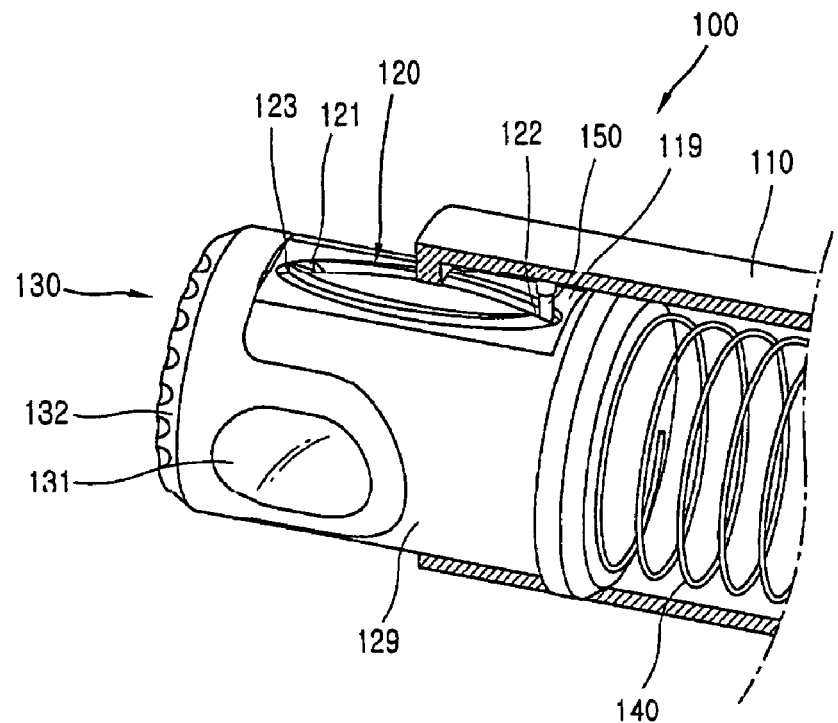
FIG. 4 is a partial cut away perspective view of the camera assembly of FIG. 3.

FIG. 3 schematically illustrates a mobile communication device (MCD) 30 in accordance with a preferred embodiment of the present invention. MCD 30 generally comprises a main body 32, a foldable cover 34 adapted to rotate relative to main body 32 via a hinge portion 36, and a camera assembly 100 coupled to hinge portion 36. Camera assembly 100 comprises a camera 130, and a camera case 110 adapted to removably accommodate camera 130. Camera 130 is elastically supported within camera case 110 via spring 140. Other means of elastic camera support may be used in accordance with the general principles of the present invention.

Figure 5:
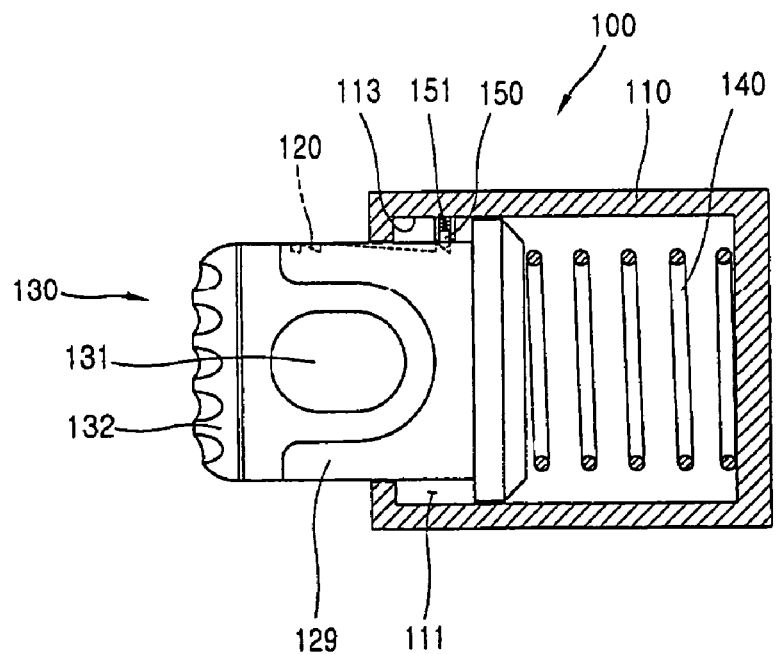
FIG. 5 is a plan view of the camera assembly of FIG. 4.
Figure 6:
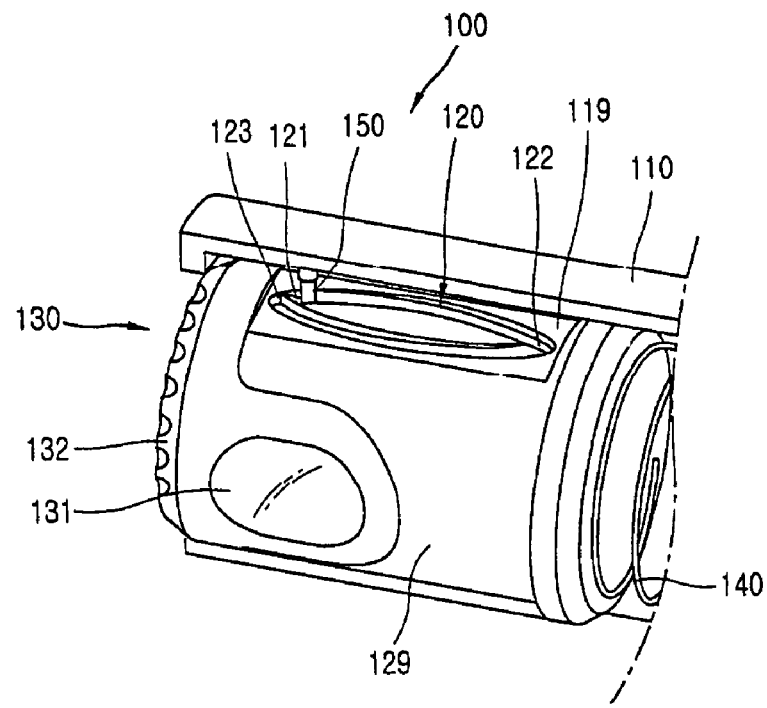
FIG. 6 is another partial cut away perspective view of the camera assembly of FIG. 3.
Figure 7:
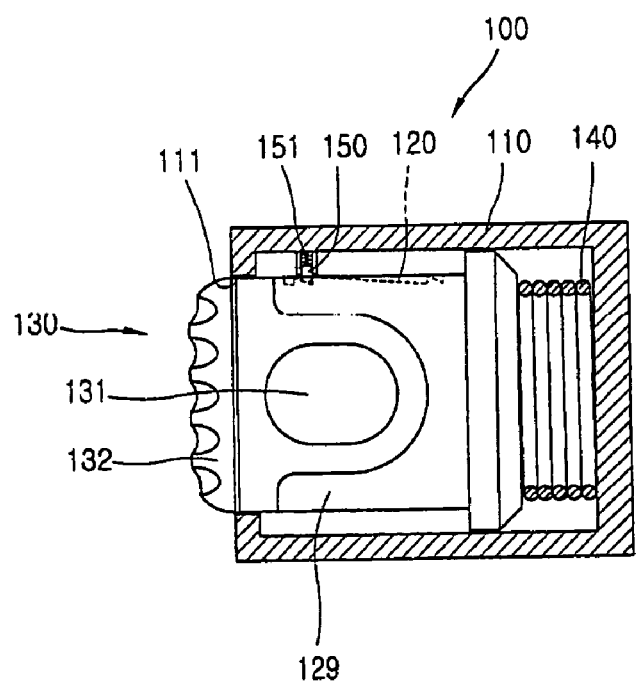
FIG. 7 is a plan view of the camera assembly of FIG. 6.

Camera 130 comprises a camera lens 131 mounted on a front portion 129 and a knob 132 mounted on a side portion thereof. Camera 130 is adapted to slide in/out of camera case 110, as generally illustrated by directional arrows 200, 202 of FIGS. 8, 10, respectively. Camera 130 is provided with a generally oval-shaped guiding groove 120 formed on an outer surface 119 thereof. Camera case 110 includes a respective pawl 150 adapted to slidably engage guiding groove 120 within interior space 111, as generally depicted in reference to FIGS. 4, 6, 8-10. Pawl 150 is elastically coupled to an inner surface 113 of camera case 110 via spring 151, as generally shown in FIGS. 5, 7. Spring 151 is biased generally toward the outer surface of guiding groove 120.

In accordance with a preferred embodiment of the present invention, guiding groove 120 is equipped with a series of ratchet indentations, such as first, second and third indentations 121, 122 and 123, respectively, as generally illustrated in reference to FIGS. 4, 6, 8-10. Each ratchet indentation (121, 122, 123) is adapted to engage and prevent pawl 150 from sliding within groove 120 in more than one direction. For example, first, second and third ratchet indentations 121, 122 and 123 may be adapted to successively engage pawl 150 as it slides within guiding groove 120 in a counterclockwise direction. In this case, first, second and third ratchet indentations 121, 122 and 123 are configured to prevent pawl movement in the reverse (clockwise) direction. Other pawl movement variations may be utilized, provided such other variations do not depart from the intended scope and spirit of the present invention.

Figure 8:
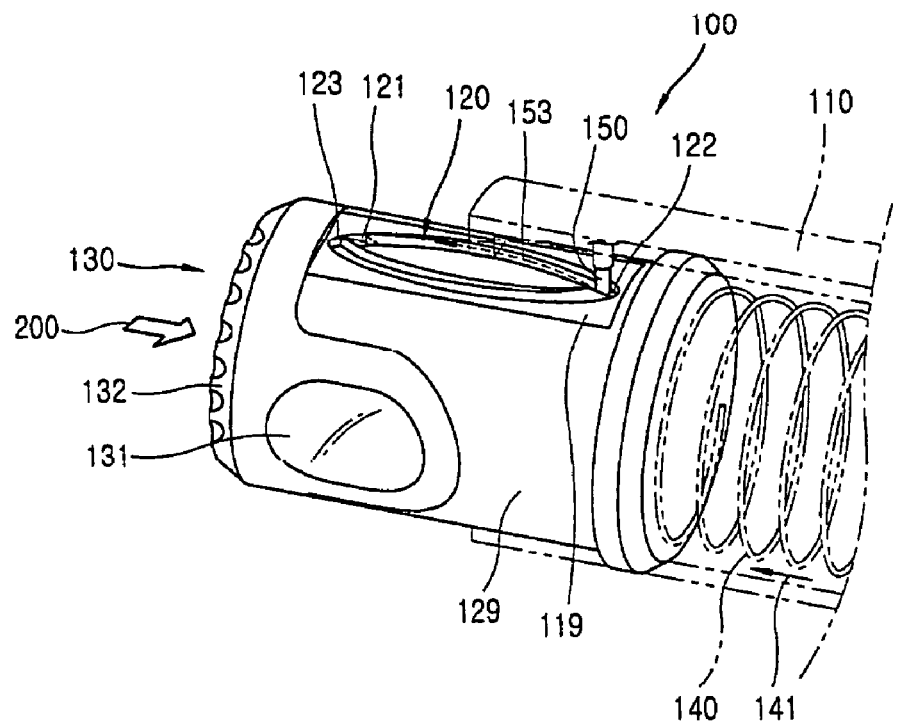
FIG. 8 is a partial cut away perspective view of the camera assembly of FIG. 3 in accordance with one embodiment of the present invention.

Assuming pawl 150 is initially engaged by second ratchet indentation 122, a user pushing on knob 132 in the general direction of arrow 200 (FIG. 8) would cause pawl 150 to slide counterclockwise within guiding groove 120 toward first ratchet indentation 121, as generally shown by directional arrow 153 of FIG. 8. In this case, the user is pushing the body of camera 130 against the bias of spring 140 with the spring bias generally depicted by directional arrow 141 of FIG. 8. As pawl 150 moves from its initial position, as generally shown in FIG. 8, to an intermediate position defined by pawl 150 being engaged by first indentation 121, as generally shown in FIG. 9, the body of camera 130 rotates accordingly about its longitudinal axis, as generally illustrated by rotational arrow 170 of FIG. 9.

Figure 9:
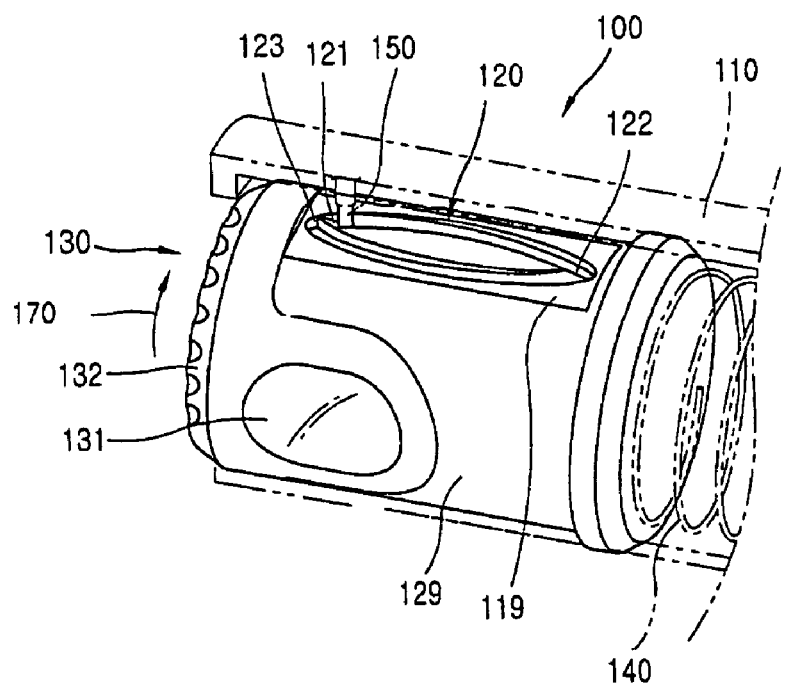
FIG. 9 is a partial cut away perspective view of the camera assembly of FIG. 3 in accordance with another embodiment of the present invention.
Figure 10:
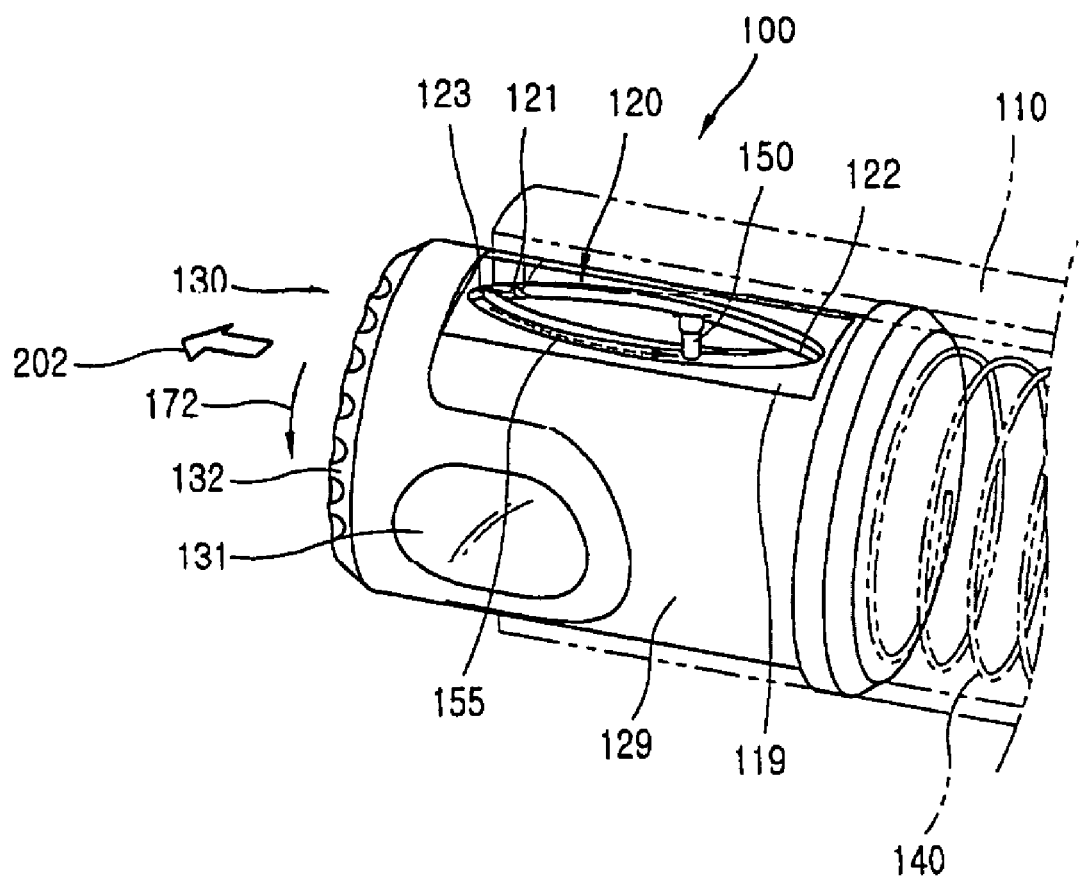
FIG. 10 is a partial cut away perspective view of the camera assembly of FIG. 3 in accordance with still another embodiment of the present invention.

In the intermediate pawl position, camera 130 is fully inserted in camera case 110 with first ratchet indentation 121 and pawl 150 being securely engaged against the bias of spring 140, as generally shown in FIG. 9. The initial pawl position may be used by the user to shoot pictures as camera lens 131 is exposed, i.e. not covered by camera case 110.

With camera 130 fully inserted in case 110, a user slightly pressing on knob 132 in the general direction of arrow 200 (FIG. 8) would cause pawl 150 to slide into third ratchet indentation 123. Third ratchet indentation 123 is configured to allow pawl 150 to slide counterclockwise toward second ratchet indentation 122 under the bias of spring 140, as generally shown by arrow 155 of FIG. 9, in the absence of a force acting in reverse, such as from a user pushing on knob 132. As pawl 150 moves from first ratchet indentation 121 to second ratchet indentation 122 counterclockwise by way of third ratchet indentation, camera 130 is being drawn out of camera case 110 in the general direction of arrow 202 of FIG. 9. As camera 130 is being drawn out of case 110, the body of camera 130 rotates accordingly about its longitudinal axis, as generally illustrated by rotational arrow 172 of FIG. 9.

A person skilled in the art would readily appreciate that providing an integral case for a mobile communication device camera as well as means for slidably drawing the camera in/out of the case is advantageous over known devices in that the user can keep the camera clean from foreign matter and preserve photographic quality.

All terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

While the present invention has been described in detail with regards to several embodiments, it should be appreciated that various modifications and variations may be made in the present invention without departing from the scope or spirit of the invention. In this regard it is important to note that practicing the invention is not limited to the applications described hereinabove.

Many other applications and/or alterations may be utilized provided that such other applications and/or alterations do not deviate from the intended purpose of the present invention. For example, the shape of the guiding groove may be varied, as needed. Furthermore, the number of ratchet indentations as well as the configuration of each indentation may be varied. Also, features illustrated or described as part of one embodiment can be used in another embodiment to provide yet another embodiment such that the features are not limited to the embodiments described above. Thus, it is intended that the present invention cover all such embodiments and variations as long as such embodiments and variations come within the scope of the appended claims and their equivalents.

What is claimed is:

1. A mobile terminal comprising:
a main body;
a case attached to the main body;
a camera unit configured to be received inside the case and to be drawn out from the case; and
a locking unit formed between the camera and the case for drawing the camera out of the case if the camera is pressed when the camera unit is inside the case, and receiving the camera into the case if the camera is pressed when the camera unit is outside,
wherein the locking unit comprises a pawl formed at an inner surface of the case, a guiding groove formed at an outer circumferential surface of the camera for slidably engaging the pawl, ratchet indentations formed at both ends of the guiding groove for locking the pawl, and an elastic member disposed at a rear surface of the camera for providing an elastic force in a direction that the camera is drawn out of the case.

2. The mobile terminal of claim 1, wherein the pawl is elastically connected to the inner surface of the case.

3. The mobile terminal of claim 1, wherein the guiding groove comprises a first groove for slidably moving the pawl when the camera is drawn out of the case and a second groove for slidably moving the pawl when the camera is received in the case.

4. The mobile terminal of claim 1, wherein the ratchet indentations comprises a first ratchet indentation formed at a first end of the guiding groove for locking the pawl when the camera is received in the case and a second ratchet indentation formed at a second end of the guiding groove for locking the pawl when the camera is drawn out of the case.

5. The mobile terminal of claim 4, wherein when the camera is rotated the pawl is separated from the second ratchet indentation thereby being elastically supported at the outer circumferential surface of the camera.

6. The mobile terminal of claim 1, wherein the camera is rotated in an axial direction when drawn out of the case.

* * * * *